(12) United States Patent
Fujii et al.

(10) Patent No.: US 6,324,739 B1
(45) Date of Patent: Dec. 4, 2001

(54) INNER RING PRESS-INSERTION JIG FOR A PIPE JOINT MADE OF RESIN

(75) Inventors: Makoto Fujii; Takuya Ishida, both of Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/546,328

(22) Filed: Apr. 10, 2000

(30) Foreign Application Priority Data

Apr. 16, 1999 (JP) .................................................. 11-109431

(51) Int. Cl.⁷ ...................................................... G23P 19/02
(52) U.S. Cl. ................................ 29/235; 29/237; 285/247
(58) Field of Search ........................... 29/235, 504, 237, 29/241, 234, 402.09, 402.18, 460, 464, 89.036, 890.14; 285/247

(56) References Cited

U.S. PATENT DOCUMENTS

| | | | |
|---|---|---|---|
| 3,653,692 | * 4/1972 | Henson | 285/242 |
| 4,584,755 | * 4/1986 | Lundquist | 29/451 |
| 4,785,517 | * 11/1988 | Takano | 29/235 |
| 4,807,343 | * 2/1989 | Wadsworth | 29/221.5 |

* cited by examiner

*Primary Examiner*—Joseph J. Hail, III
*Assistant Examiner*—Daniel Shanley
(74) *Attorney, Agent, or Firm*—Jones, Tullar & Cooper, P.C.

(57) ABSTRACT

In the inner ring press-insertion jig for a pipe joint made of resin according to the invention, a diameter-increasing ring member in which the outer diameter can be changed to the maximum outer diameter and to the minimum outer diameter by axial movement is fitted onto a front small-diameter portion of a holder which insertingly holds a sleeve-like inner ring. A fixing structure which, under a state where the outer diameter of the diameter-increasing ring member is changed to the maximum outer diameter, positionally fixes the diameter-increasing ring member is formed between the diameter-increasing ring member and the holder in a manner that the fixation can be canceled. Although pressing inserting and connecting works can be performed at a very high efficiency without requiring preheating or the like on an end portion of a pipe member made of resin, an inner ring can be easily pressingly inserted and fixed into the pipe member without damaging the tip end of the inner ring and the pipe member made of resin even when there is a production error of a small degree, and in an increased diameter state which is always uniform and appropriate.

11 Claims, 9 Drawing Sheets

INNER RING PRESS-INSERTION JIG FOR A PIPE JOINT MADE OF RESIN

BACKGROUND OF THE INVENTION

1. Field of the Invention

The present invention relates to an inner ring press-inserting jig for a pipe joint made of resin, and particularly to an inner ring press-insertion jig for a pipe joint made of resin which is used in the connection of piping for a liquid having high purity of ultrapure water to be handled in a production process of various technical fields such as the production of semiconductor devices, the production of medical equipment and medicines, food processing, and chemical industry. The jig is used for pressingly inserting and fixing into one end portion of a resin pipe member serving as one connecting member of the pipe joint made of resin, a sleeve-like inner ring for enhancing the sealing and locking forces to be exerted between the pipe member and the joint body.

2. Description of the Prior Art

Figure 14:
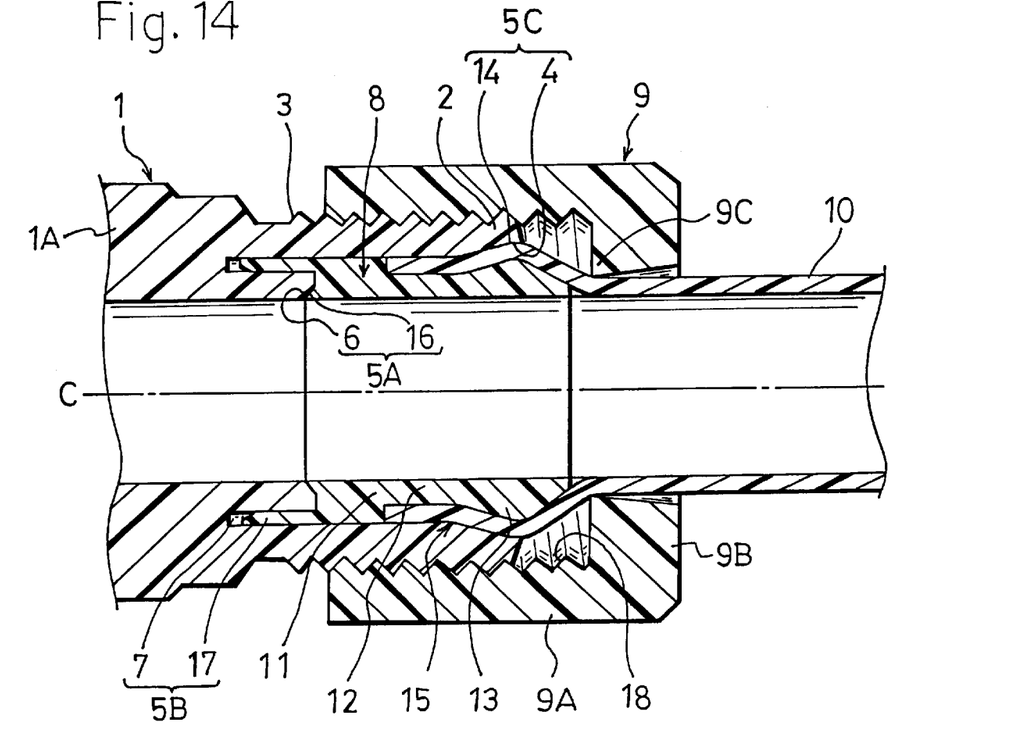
FIG. 14 is a longitudinal section side view showing an example of a pipe joint made of resin.

Conventionally, as pipe joints made of resin of this kind, those having a configuration shown in FIG. 14 are known. The pipe joint made of resin shown in FIG. 14 comprises a cylindrical joint body 1 produced from resin having excellent. chemical resistance and heat resistance, such as PFA, PTFE, and ETFE, a sleeve-like inner ring 8, and a cap nut-like pressing ring 9.

In the joint body 1, a cylindrical pipe receiving port 2 is formed in one end in the axial direction, and an inclined sealing face 4 which elongates in a direction intersecting the axis C and forms a tertiary sealing portion 5C that will be described later is formed in the inlet of the pipe receiving port 2. An annular sealing end face 6 which forms a primary sealing portion 5A that will be described later is formed in an inner portion of the pipe receiving port 2. A cylindrical groove 7 which forms a secondary sealing portion 5B that will be described later is formed in a position which is located at a radius which is greater than the annular sealing end face 6 in a radial direction. An external thread portion 3 is formed on the outer periphery of the pipe receiving port 2.

The sleeve-like inner ring 8 is formed so as to have an inner diameter which is equal to the inner diameters of a resin pipe member 10 and a cylinder portion IA of the joint body 1, so as not to impede movement (flow) of a fluid. The inner ring has a fitting portion 11 which can be fitted into the pipe receiving poll: 2 of the joint body 1. A bulge portion 13 which has a mountain-like section shape is formed on the outer side on the tip end side of a pipe member press insertion portion 12 which is formed continuously with the fitting portion 11. An insertion portion 15 of the pipe member 10 is formed which is to be inserted into the pipe receiving port 2 of the joint body 1, and which has an outer peripheral sealing face 14. When the press insertion portion 12 of the inner ring 8 is pressingly inserted into one end portion of the pipe member 10 under a state where the fitting portion 11 projects from the end portion of the pipe member 10, the diameter of the peripheral wall of the pipe member 10 in a place corresponding to the bulge portion 13 is increased to cause the outer peripheral sealing face 14 to abut against the inclined sealing face 4 in the axial direction which is formed in the inlet of the pipe receiving port 2 of the joint body 1, thereby forming the tertiary sealing portion 5C.

In the fitting portion 11 of the inner ring 8 which projects from the pipe member 10, a protruding inner end face 16 is formed. When the insertion portion 15 of the pipe member 10 is inserted into the pipe receiving port 2 of the joint body 1, the protruding inner end face 16 abuts against the annular sealing end face 6 in the axial direction to form the primary sealing portion 5A. Each of the protruding inner end face 16 and the annular sealing end face 6 is formed into a tapered face in which the diameter is gradually reduced toward the inner periphery side. A cylindrical sealing portion 17 which projects in the axial direction outwardly more than the protruding inner end face 16 configured by the tapered. face is integrally projected from a position of the protruding inner end face 16 on the outer side in a radial direction. The cylindrical sealing portion 17 is to be pressingly inserted into the cylindrical groove 7 to form the secondary sealing portion 5B.

In the cap nut-like pressing ring 9, an internal thread portion 18 which is to be screwed to the external thread portion 3 of the joint body 1 is formed in the inner peripheral face of a cylindrical portion 9A, and an annular pressing portion 9B is continuously integrated with an outer end portion of the cylindrical portion 9A. The annular pressing portion 9B elongates toward the axial center and externally presses the pipe member 10. A pressing edge 9C is formed in an inner edge position of the annular pressing portion 9B.

In the pipe joint made of resin having the thus configured components 1, 8, and 9, the press insertion portion 12 of the inner ring 8 is pressingly inserted and fixed into the one end portion of the pipe member 10 to increase the diameter of the peripheral wall of the pipe member 10 in a place corresponding to the bulge portion 13 formed in the press insertion portion 12, whereby both the components 8 and 10 are integrally coupled together to form the insertion portion 15 of the pipe member 10. Under this state, the insertion portion 15 of the pipe member 10 is inserted into the pipe receiving port 2 of the joint body 1 to advance the cylindrical sealing portion 17 of the inner ring 8 into the cylindrical groove 7 of the joint body 1.

Thereafter, the internal thread portion 18 of the pressing ring 9 which is loosely fitted onto and held on the outer side of the pipe member 10 is screwed to the external thread portion 3 of the joint body 1 to cause the pressing ring 9 to screwingly advance toward the joint body 1. Therefore, the inner ring 8 is pressed in the axial direction by the pressing edge 9C of the annular pressing portion 9B, so that the cylindrical sealing portion 17 of the inner ring 8 is pressingly inserted into the cylindrical groove 7 of the joint body 1. As a result, a contact pressure is generated between the inner and outer peripheral faces of the two components 17 and 7, thereby forming the secondary sealing portion 5B which elongates in the axial direction. The pressing ring 9 is further screwingly advanced to be strongly tightened. As a result, the axial length of the secondary sealing portion 5B is increased, and the protruding inner end face 16 of the inner ring 8 abuts against the annular sealing end face 6 of the pipe receiving port 2 of the joint body 1 to generate a contact pressure in the axial direction between the components 16 and 6, thereby forming the primary sealing portion 5A. Furthermore, the outer peripheral sealing face 14 which is formed on the insertion portion 15 of the pipe member 10 abuts in the axial direction against the inclined sealing face 4 which is formed in the inlet of the pipe receiving port 2 of the joint body 1, thereby forming the tertiary sealing portion 5C. As a result, the pipe member 10 is connected to the joint body 1 under a slipping off preventing state and a sealed state.

Figure 15:
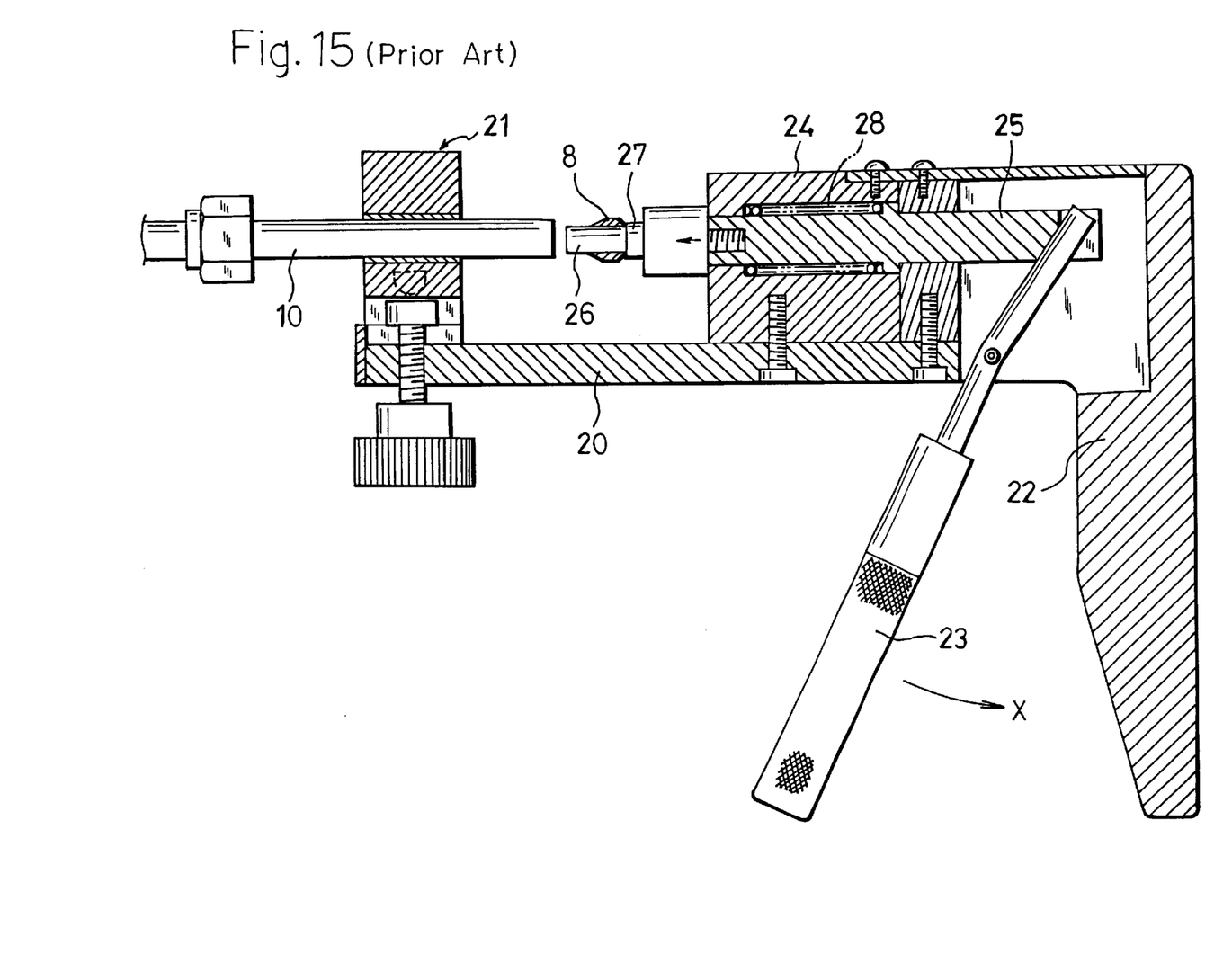
FIG. 15 is a longitudinal section side view of an inner ring inserting apparatus which is used in the prior art.

As a jig for pressingly inserting and fixing the sleeve-like inner ring 8 into the one end portion of the pipe member made of resin 10 in the thus configured pipe joint made of resin, known is an inner ring inserting apparatus which is disclosed in, for example, Japanese Utility Model Publication Laying-Open No. 62-134629. In the inner ring inserting apparatus of the prior art, as shown in FIG. 15, a clamp portion 21 which fixedly holds the pipe member 10 is disposed in one end side of a base arm 20. A grip portion 22, and a toggle lever 23 which is swingably pivotally attached to the grip portion 22 are disposed in the other end side of the base arm 20. A slide shaft 25 is engaged at one end with an end portion of the toggle lever 23, and slidably held by a guide base 24 attached to the base arm 20 while being movingly urged by a spring 28 in a direction along which the shaft is separated from the clamp portion 21. A feed member 27 having a feed arrow 26 which can fittingly hold the inner ring 8 is screwingly fixed to the other end of the slide shaft 25.

Figure 16:
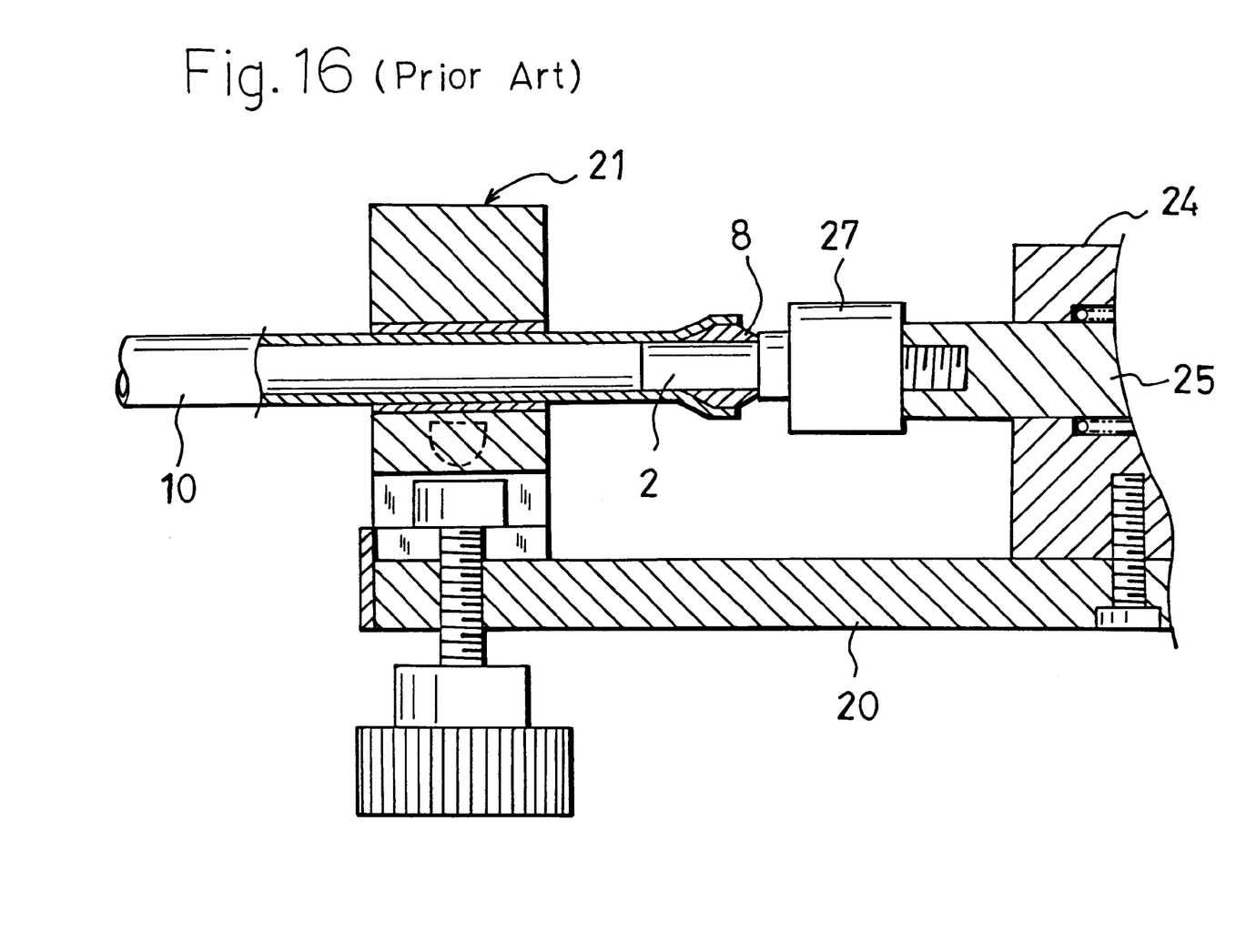
FIG. 16 is a longitudinal section side view of main portions showing a state of insertion by the inner ring inserting apparatus.

In the thus configured inner ring inserting apparatus, the pipe member 10 is clamped by the clamp portion 21, the inner ring 8 is fittingly held by the feed arrow 26 of the feed member 27, and the grip portion 22 is then gripped to strongly pull the toggle lever 23 in the direction of the arrow x in FIG. 15 against the elastic urging force of the spring 28, whereby, as shown in FIG. 16, the feed arrow 26 and the inner ring 8 are inserted and fixed into one end portion of the pipe member 10. After the insertion and fixation are completed, the toggle lever 23 is returned by the urging force of the spring 28, so that the feed arrow 26 is pulled out from the one end portion of the pipe member 10 while leaving the inner ring 8 in the pipe member 10. As a result, the inner ring 8 is inserted and fixed into the one end portion of the pipe member 10, and the diameter of the peripheral wall of the pipe member 10 in a place corresponding to the bulge portion 13 formed by the press insertion portion 12 of the inner ring 8 is increased, thereby forming the insertion portion 15 of the pipe member 10 in which the two components 8 and 10 are integrally coupled together.

However, the inner ring inserting apparatus of the prior art configured as described above has the following problems. Even when a small dimensional error such as that the inner diameter of the pipe member 10 is slightly larger than the outer diameter of the feed arrow 26 of the feed member 27, not only the feed arrow 26 but also the inner ring 8 which is fittingly held thereby cannot be pressingly inserted into the pipe member 10. When the inner ring 8 is forcedly inserted into the pipe member 10, the tip end of the inner ring 8 and the inner peripheral face of the pipe member 10 are damaged.

In order to prevent such problems from arising, the outer diameter of the feed arrow 26 may be set to be smaller than the inner diameter of the pipe member 10. In this case, the inner diameter of the inner ring 8 which is to be fittingly held by the feed arrow is naturally smaller than the inner diameter of the pipe member 10. In an insertion state, therefore, a step is formed between the inner peripheral face of the pipe member 10 and that of the inner ring 8. There arises another problem in that this step tends to cause a liquid to stagnate therein. This is not preferable in a pipe joint which is used for transporting a liquid having high purity or ultrapure water.

It may be contemplated that an end portion of the pipe member made of resin 10 is softened by heating before press insertion and the inner ring 8 is then inserted into the end portion of the pipe member 10 by the feed arrow 26. In this case, there are further problems as follows. A heating apparatus such as a heater must be prepared in order to perform the heating operation. The connecting work cannot be performed until the pipe member 10 is cooled after the press insertion, so that completion of the predetermined work of connecting a pipe joint requires a prolonged time period.

SUMMARY OF THE INVENTION

The present invention has been conducted in view of the above-mentioned circumstances.

It is an object of the present invention to provide an inner ring press-insertion jig for a pipe joint made of resin which, while pressing inserting and connecting works can be performed at a very high efficiency without requiring preheating or the like, can easily pressingly insert and fix an inner ring into an end portion of a pipe member without damaging the tip end of the inner ring and the pipe member even when a diameter is somewhat varied because of a production en error the like, and in an increased diameter state which is always uniform and appropriate.

In order to attain this object, the inner ring press-inserting jig for a pipe joint made of resin according to the present invention comprises an inner ring press-inserting jig for a pipe joint made of resin which pressingly inserts and fixes a sleeve-like inner ring (8) into one end portion of a pipe member made of resin (10) by relative movement in an axial direction with respect to the pipe member made of resin (10), wherein a diameter-increasing ring member (31) in which an outer diameter is variable is fitted onto a front small-diameter portion (30a) of a holder (30) to be movable in the axial direction, the sleeve-like inner ring (8) being insertingly held by the holder, the diameter-increasing ring member (31) is configured so that an outer diameter is changed to a maximum outer diameter (Dmax.) by movement in one axial direction with respect to the holder (30), the maximum diameter being equal to or larger than an outer diameter (D1) of a tip end portion of the inner ring (8), and to a minimum outer diameter (Dmin.) by movement in another axial direction with respect to the holder (30), the minimum diameter being smaller than an inner diameter (d1) of the inner ring (8), and a fixing structure (32) which, when the diameter of the diameter-increasing ring member (31) is changed to the maximum outer diameter (Dmax.), positionally fixes the diameter-increasing ring member (31) to the holder (30) formed between the diameter-increasing ring member (31) and the holder (30) in a manner that the fixation can be cancelled.

According to the present invention of the above configuration, the inner ring is insertingly held by the holder, and the diameter-increasing ring member which is fitted onto the front small-diameter portion of the holder is positionally fixed to the holder by the fixing structure under a state where the outer diameter is changed to the maximum outer diameter by movement in one axial direction. When the jig is moved in this state toward the one end portion of the fixed pipe member made of resin, the diameter-increasing ring member is advanced into the one end portion of the pipe member. This causes the pipe member to over-ride the outer peripheral face of the inner ring while the diameter of the pipe member is increased, so that the pipe member is inserted into the inner ring. Thereafter, the jig is moved in pulled out from the pipe member while changing the outer diameter to the minimum outer diameter. As a result, the work of pressingly inserting the inner ring into the one end portion of the pipe member is completed.

As described above, without requiring facilities and preheating of the pipe member, the pipe member can be pressingly inserted in a cold state. Therefore, press insertion of the inner ring to form a pipe joint can be performed with very high efficiency. Furthermore, even when the inner diameter of the inner ring is equal to or slightly larger than that of the pipe member, the inner ring can be pressingly inserted in an easy and smooth manner into the end portion of the pipe member without damaging these components. In addition, the degree of the diameter increase of the pipe member can always be made uniform and appropriate so that the diameter is prevented from being excessively increased nor from being ununiformly increased. Therefore, it is possible to attain an effect that the inner ring can be pressingly inserted into the one end portion of the pipe member easily and surely.

In the thus configured inner ring press-insertion jig for a pipe joint made of resin, as the fixing structure which, when the outer diameter of the diameter-increasing ring member is changed to the maximum outer diameter, fixes the diameter-increasing ring member to the holder, a structure may be employed which is configured by: a projected portion which is radially projected from an inner peripheral face of the diameter-increasing ring member or an outer peripheral face of the holder; an axial sliding guiding groove which is formed in an outer peripheral face of the holder or an inner peripheral face of the diameter-increasing ring member so as to be fitted with the projected portion to slidingly guide axial movement of the diameter-increasing ring member; a projected piece which is projectingly formed on the outer peripheral face of the holder or the inner peripheral face of the diameter-increasing ring member to be continuous with an end portion of the sliding guiding groove, and which can be moved to over-ride the projected portion immediately before the outer diameter of the diameter-increasing ring member is changed to the maximum outer diameter; and an engaging groove which is formed in the outer peripheral face of the holder or the inner peripheral face of the diameter-increasing ring member, and with which the projected portion that is moved to over-ride the projected piece under a state where the outer diameter of the diameter-increasing ring member is changed to the maximum outer diameter is to be engaged. According to this configuration, the fixing force which is exerted when the outer diameter of the diameter-increasing ring member is changed to the maximum outer diameter is so small that the diameter-increasing ring member can be easily pulled out together with the holder from the pipe member while the end portion of the diameter-increasing ring member is pushed by the tip end face of the inner ring that is pressingly inserted and fixed into the one end portion of the pipe member, to return the outer diameter to the maximum outer diameter, only by moving the jig in a pulling-out direction.

In the thus configured inner ring press-insertion jig for a pipe joint made of resin, the diameter-increasing ring member is formed by: a front diameter-variable portion which is changeable to the maximum outer diameter and to the minimum outer diameter; and a base fixed cylindrical portion having an inner diameter which is smaller than an inner diameter of the front diameter-variable portion, and which is to be fitted into the front small-diameter portion of the holder, the holder is formed by: the front small-diameter portion which fittingly holds the base fixed cylindrical portion of the diameter-increasing ring member; a large-diameter portion which insertingly holds the inner ring; and an intermediate-diameter portion which is located between the front small-diameter portion and the large-diameter portion, and which fittingly holds the front diameter-variable portion of the diameter-increasing ring member, and, as a structure for fixing the holder in a thus configured inner ring press-insertion jig, a conical tapered face is formed in a connecting place between the front small-diameter portion and the intermediate-diameter portion of the holder, or a connecting place between the intermediate-diameter portion and the large-diameter portion of the holder. According to this configuration, when the diameter-increasing rig member is moved in one of the axial directions so that an outer diameter of the front diameter-variable portion is changed to the maximum outer diameter, the tip end inner peripheral face of the base fixed cylindrical portion or the inner peripheral face of the front diameter-variable portion of the diameter-increasing ring member is fitted onto the conical tapered face in a shrink fitting state to positionally fix the diameter-increasing ring member to the holder. In the case where the jig is to be used for a small-diameter pipe joint, it is not necessary to apply a grooving work on the diameter-increasing ring member and the holder in which the diameter is shortened and the strength is reduced. Therefore, production is facilitated, and reduction in the strength of such small-diameter components can be suppressed.

In the thus configured inner ring press-insertion jig for a pipe joint made of resin, when both the holder, and the diameter-increasing ring member are made of resin material, it is possible to attain excellent effects in corrosion resistance and chemical resistance during transportation of a liquid having high purity or ultrapure water which is used in production of semiconductor devices.

In the case where a resin material is used, usually, it is preferable to configure the components by, for example, polypropylene (PP) which is economical. When the diameter-increasing ring member is configured of a fluororesin, such as polyethylene terephtalate (PET), polytetrafluoroethylene (PTFE), or PFA, particularly, the coefficient of friction between the diameter-increasing ring member and the pipe member can be reduced, so that press insertion of the inner ring into the pipe member can be preformed more smoothly.

In the case where the jig is to be used for a small-diameter pipe joint, a configuration may be employed in which the holder is configured by a metal material and a coating of resin such as a fluororesin is applied to an outer peripheral face of the holder. According to this configuration, metal ions are prevented from being deposited onto the jig while ensuring a strength necessary for a jig, so that also a disadvantage that, during transportation, impurities enter a liquid having high purity or ultrapure water which is used in production of semiconductor devices can be eliminated.

Other objects and effects of the present invention will be more apparent from the following description of embodiments.

PREFERRED EMBODIMENTS OF THE INVENTION

Hereinafter, embodiments of the present invention will be described with reference to the accompanying drawings.

Figure 1:
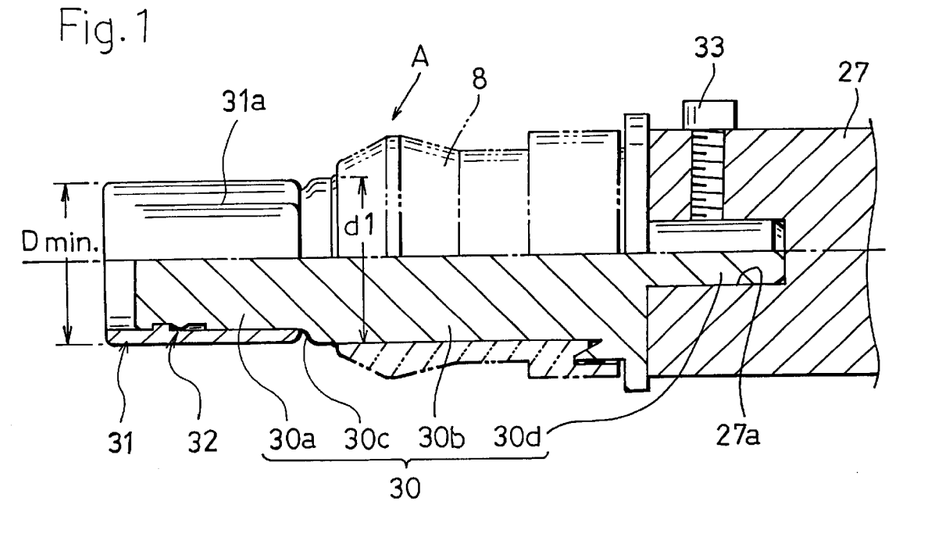
FIG. 1 is a longitudinal half section side view of a first embodiment of the inner ring press-insertion jig for a pipe joint made of resin according to the invention, in the state where a diameter-increasing ring member has the minimum outer diameter.
Figure 2:
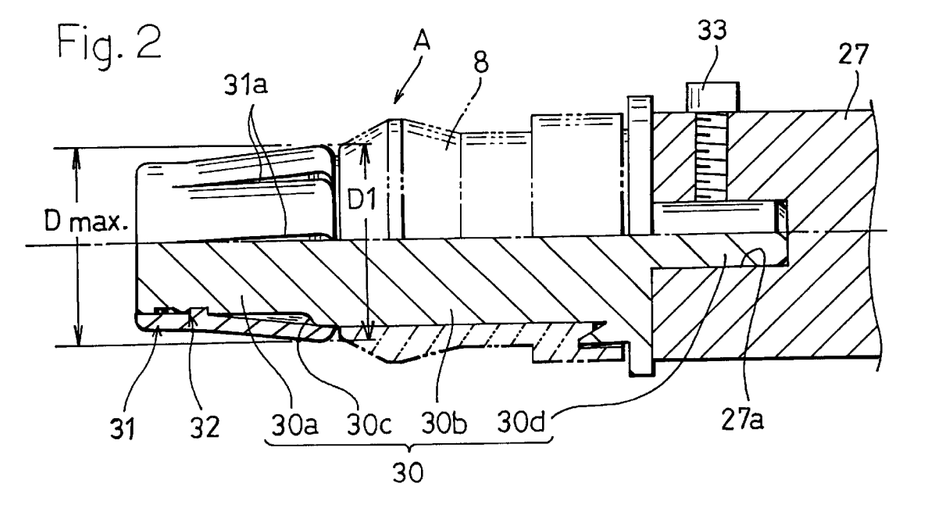
FIG. 2 is a longitudinal half section side view of the inner ring press-insertion jig for a pipe joint made of resin in the state where the diameter-increasing ring member has the maximum outer diameter.

FIGS. 1 and 2 are longitudinal half section side views showing a first embodiment of the inner ring press-insertion jig or a pipe joint made of resin according to the present invention. The inner ring press-insertion jig A is configured by a holder 30 having: a large-diameter portion 30b which insertingly holds an inner ring 8, and which straightly elongates in the axial direction; a small-diameter portion 30a which is formed integrally with the tip end side of the large-diameter portion via a conical face 30c; and a mounting shaft portion 30d which is insertingly fitted into a holding hole 27a formed in the tip end of the feed member 27 of the inner ring inserting apparatus that has been described with reference to FIG. 15, and which can be the fixed by a set bolt 33, and a diameter-increasing ring member 31 which is fitted onto the small-diameter portion 30a of the holder 30 so as to be movable in the axial direction. The whole holder 30 and the diameter-increasing ling member 31 are produced from a resin material such as PP.

Plural notched portions 31a which are arranged in the circumferential direction at appropriate intervals, and which reach one end in the axial direction are formed in a peripheral wall portion of the diameter-increasing ring member 31.

When the diameter-increasing ring member 31 is moved in one of the axial directions with respect to the holder 30, the notched portions 31a are opened, and the outer diameter is changed to the maximum outer diameter (Dmax.) which is equal to or slightly larger than the outer diameter (D1) of the tip end portion of the inner ring 8 as shown in FIG. 2. When the diameter-increasing ring member 31 is moved in the other one of the axial directions, the notched portions 31a are closed, and the outer diameter is changed to the minimum outer diameter (Dmin.) which is smaller than the inner diameter (d1) of the inner ring 8 as shown in FIG. 1.

A fixing structure 32 which, when the outer diameter of the diameter-increasing ring member 31 is changed to the maximum outer diameter (Dmax.), positionally fixes the diameter-increasing ring member 31 to the holder 30, is formed between the diameter-increasing ring member 31 and the small-diameter portion 30a of the holder 30 in a manner that fixation can be cancelled.

Figure 3:
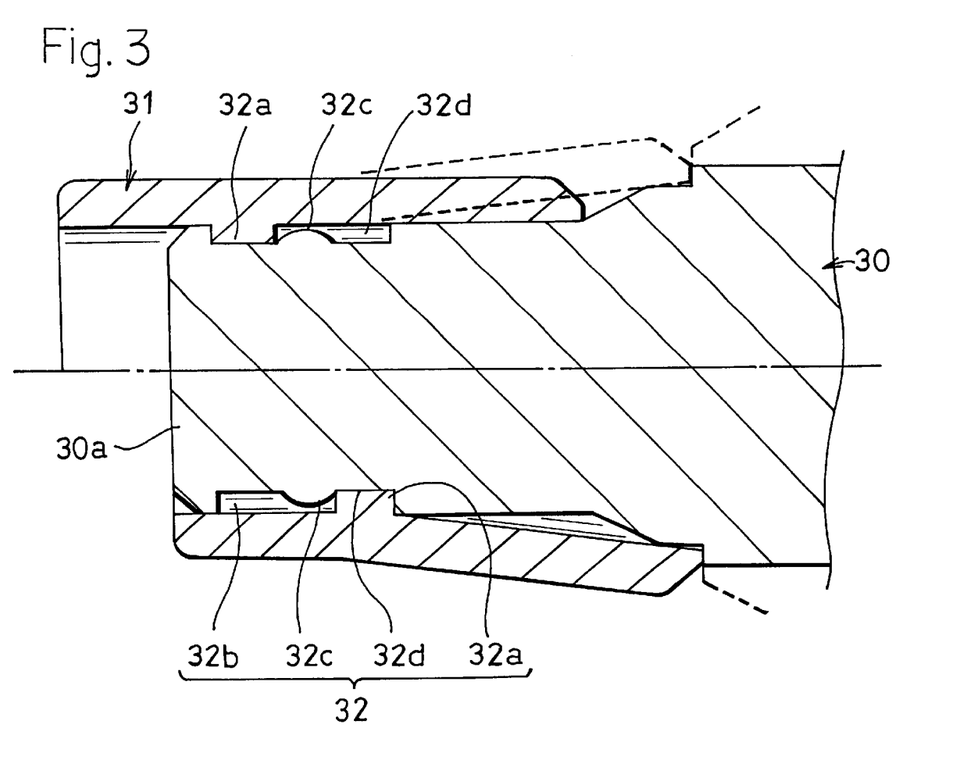
FIG. 3 is an enlarged longitudinal section side view of main portions of the inner ring press-insertion jig for a pipe joint made of resin.

As shown in FIG. 3, the fixing structure 32 is configured by: a projected portion 32a which projects radially outwardly form the inner peripheral face of the diameter-increasing ring member 31; an axial sliding guiding groove 32b which is formed in the outer peripheral face of the small-diameter portion 30a of the holder 30 so as to be fitted with the projected portion 32a to slidingly guide axial movement of the diameter-increasing ring member 31; a projected piece 32c which is ptrojectingly formed on the outer peripheral face of the small-diameter portion 30a of the holder 30 to be continuous with an end portion of the sliding guiding groove 32b, and which can be moved to over-ride the projected portion 32a immediately before the outer diameter of the diameter-increasing ring member 31 is changed to the maximum outer diameter (Dmax.); and an engaging groove 32d which is formed in the outer peripheral face of the small-diameter portion 30a of the holder 30, and with which the projected portion 32a that is moved to over-ride the projected piece 32c under a state where the outer diameter of the diameter-increasing ring member 31 is changed to the maximum outer diameter (Dmax.) is to be engaged.

Next, the working procedure in which the inner ring 8 is pressingly inserted and fixed into one end portion of the pipe member 10 by using the thus configured inner ring press-insertion jig A for a pipe joint made of resin, to form the insertion portion 15 of the pipe member made of resin shown in FIG. 14 will be described.

Figure 4:
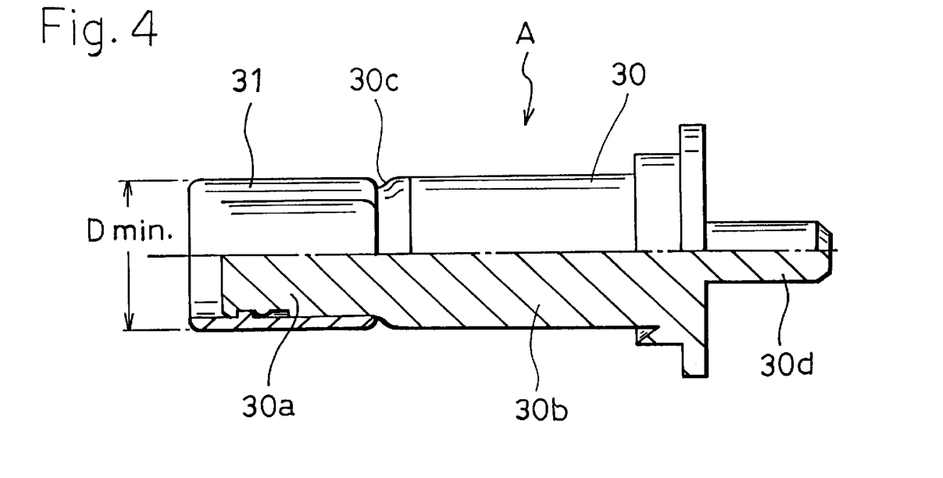
FIG. 4 is a longitudinal half section side view showing a state before a work of press insertion by the inner ring press-insertion jig for a pipe joint made of resin.

(1) The mounting shaft portion 30d of the holder 30 is insertingly fitted into the holding hole 27a formed in the tip end of the feed member 27 of the inner ring inserting apparatus shown in FIG. 15, and then fixed by the set bolt 33. Thereafter, the diameter-increasing ring member 31 which is fitted onto the small-diameter portion 30a is moved in one of the axial directions to set the outer diameter of the diameter-increasing ring member 31 to the minimum outer diameter (Dmin.) shown in FIG. 4.

Figure 5:
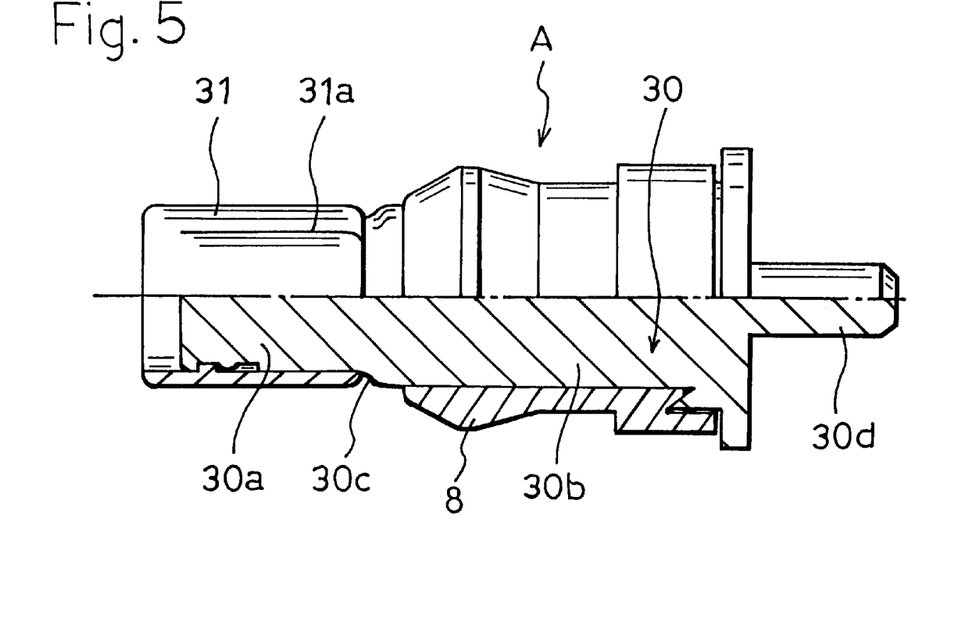
FIG. 5 is a longitudinal half section side view showing a first state during the work of press insertion by the inner ring press-insertion jig for a pipe joint made of resin.

(2) Under this state, as shown in FIG. 5, the inner ring 8 is insertingly held by the large-diameter portion 30b of the holder 30.

Figure 6:
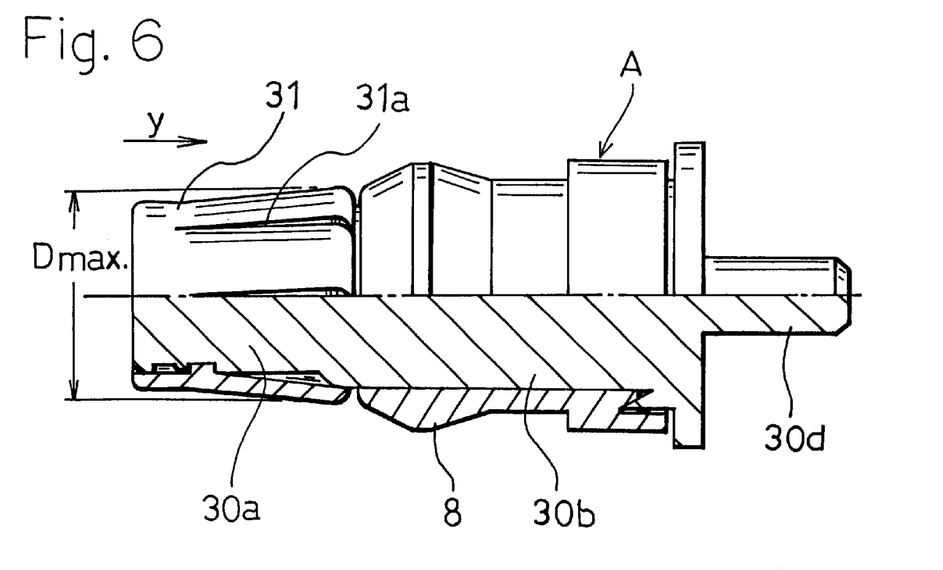
FIG. 6 is a longitudinal half section side view showing a second state during the work of press insertion by the inner ring press-insertion jig for a pipe joint made of resin.

(3) Next, the diameter-increasing ring member 31 is moved in the other one of the axial directions indicated by the arrow y in FIG. 6, whereby the notched portions 31a are opened so that the cuter diameter of the diameter-increasing ring member 31 is changed to the maximum outer diameter (Dmax.) which is equal or slightly larger than the outer diameter (D1) of the tip end portion of the inner ring 8 as shown in FIG. 6. Under this state, the diameter-increasing ring member 31 is positionally fixed to the holder 30 by the fixing structure 32. At this time, the projected portion 32a of the fixing structure 32 is moved to over-ride the projected piece 32c, and then engaged with the engaging groove 32d which is formed in the outer peripheral face of the small-diameter portion 30a of the holder 30, to hold the diameter-increasing ring member 31 to the maximum outer diameter (Dmax.).

Figure 7:
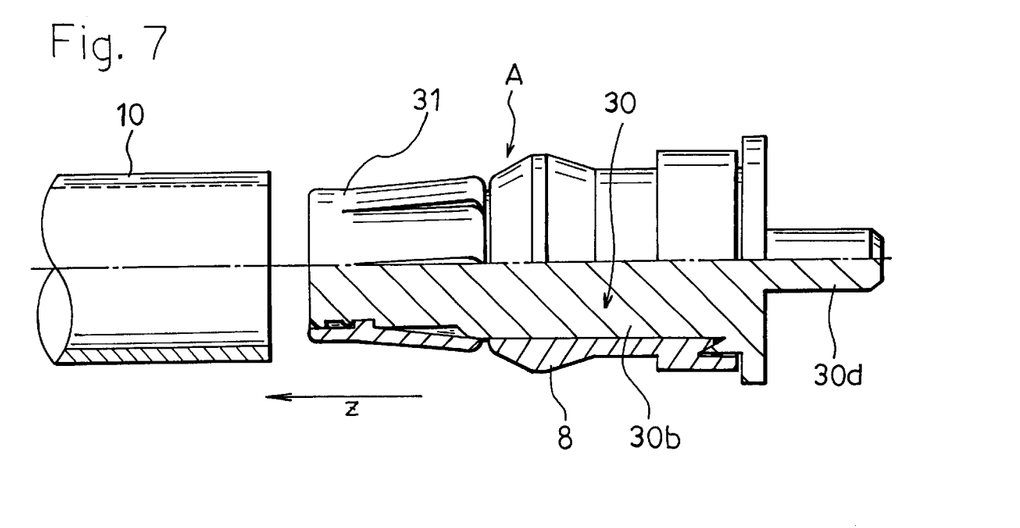
FIG. 7 is a longitudinal half section side view showing a third state during the work of press insertion by the inner ring press-insertion jig for a pipe joint made of resin.
Figure 8:
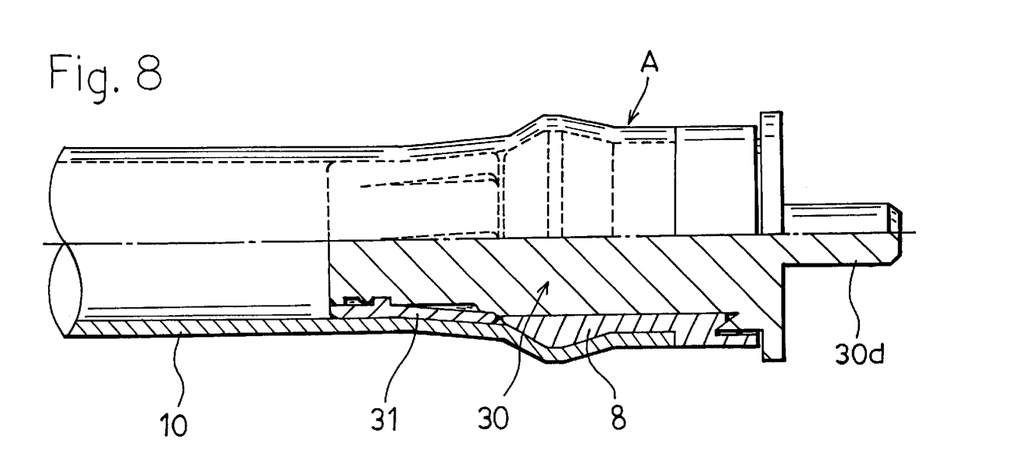
FIG. 8 is a longitudinal half section side view showing a fourth state during the work of press insertion by the inner ring press-insertion jig for a pipe joint made of resin.

(4) Thereafter, the pipe member 10 is clamped by the clamp portion 21 of the inner ring inserting apparatus shown in FIG. 15, and the grip portion 22 of the inner ring inserting apparatus is gripped to strongly pull the toggle lever 23 in the direction of the arrow x in FIG. 15 against the elastic urging force of the spring 28, whereby the press-insertion jig A is advanced in the forward direction toward the pipe member 10 as indicted by the arrow z in FIG. 7 so that the diameter-increasing ring member 31 is moved into one end portion of the pipe member 10. As a result, while increasing the diameter the pipe member 10 is moved onto the outer peripheral face of the inner ring 8, and then together with the jig A pressingly inserted and fixed into the one end portion of the pipe member 10 as shown in FIG. 8.

Figure 9:
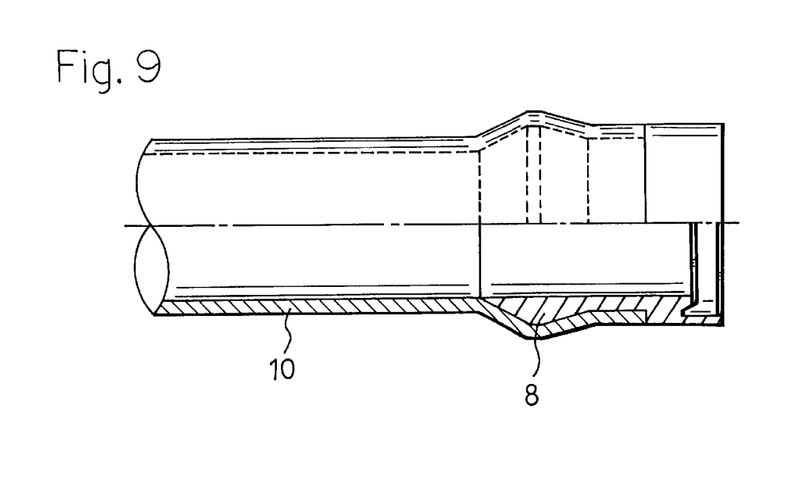
FIG. 9 is a longitudinal half section side view showing a completion state of the work of press insertion by the inner ring press-insertion jig for a pipe joint made of resin.

(5) Thereafter, the grip portion 22 of the inner ring inserting apparatus is released so that the toggle lever 23 is returned by the urging force of the spring 28, thereby moving the jig A in the pulling-out direction. As a result, the jig A is pulled out from the pipe member 10 while the outer diameter of the diameter-increasing ring member 31 is being changed to the minimum outer diameter (Dmin.), and the work of pressingly inserting the inner ring 8 into the one end portion of the pipe member 10 is completed as shown in FIG. 9.

As described above, without requiring preheating on the end portion of the pipe member 10, the inner ring 8 can be pressingly inserted and fixed in an easy and smooth manner into the end portion of the pipe member 10 while always increasing appropriately and uniformly the diameter of the end portion of the pipe member 10, only by moving the jig A in an axial direction with respect to the pipe member 10. Furthermore, even when the inner diameter of the inner ring 8 is be equal to or slightly larger than that of the pipe member 10 because of a production error or the like, it is possible to surely avoid occurrence of a situation which is not preferable to a pipe joint, such as that in which the tip end of the inner ling 8 and the inner peripheral face of the pipe member 10 are damaged.

In the first embodiment, the configuration in which the pipe member 10 and the joint body have a large diameter so as to be used for a large-diameter pipe joint, and the whole holder 30 and the diameter-increasing ring member 31 are produced from a resin material such as PP has been described. When the diameter-increasing ring member 31 is configured by a fluororesin material such as PET, PTFE, or PFA, the coefficient of friction between the diameter-increasing ring member 31 and the pipe member 10 can be reduced, so that press insertion of the inner ring 8 into the pipe member 10 can be performed more smoothly.

Figure 10:
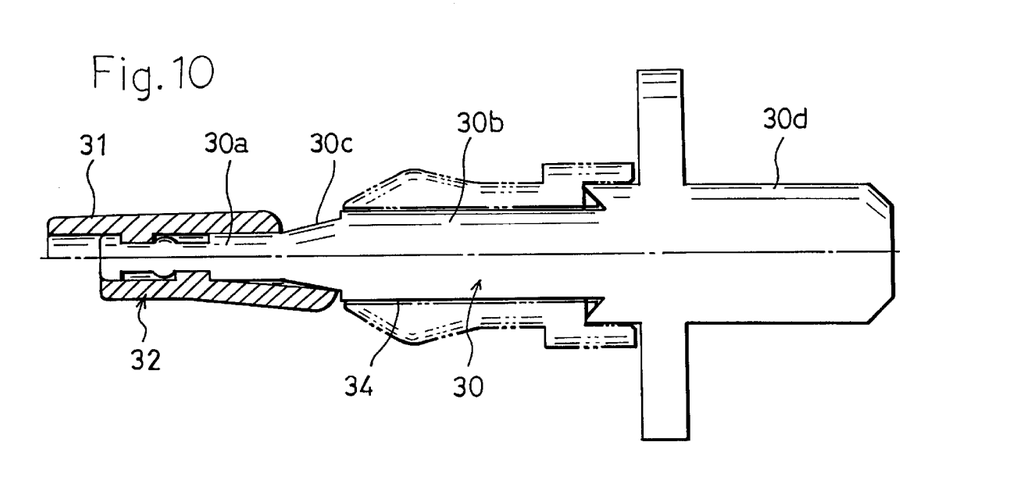
FIG. 10 is a longitudinal section side view showing a second embodiment of the inner ring press-insertion jig for a pipe joint made of resin according to the invention.

FIG. 10 is a longitudinal section side view showing a second embodiment of the inner ring press-insertion jig A for a small-diameter pipe joint in which both the pipe member 10 and the joint body are small. In the second embodiment, the holder 30 is configured by a metal material such as SUS304, and a coating layer 34 of resin such as fluororesin is applied to the outer peripheral face of the holder 30 made of a metal material. According to this configuration, metal ions are prevented from being deposited onto the jig while sufficiently ensuring the strength of the holder 30, so that a disadvantage that, during transportation, impurities enter a liquid having high purity or ultrapure water which is used in production of semiconductor devices can be eliminated.

Figure 11:
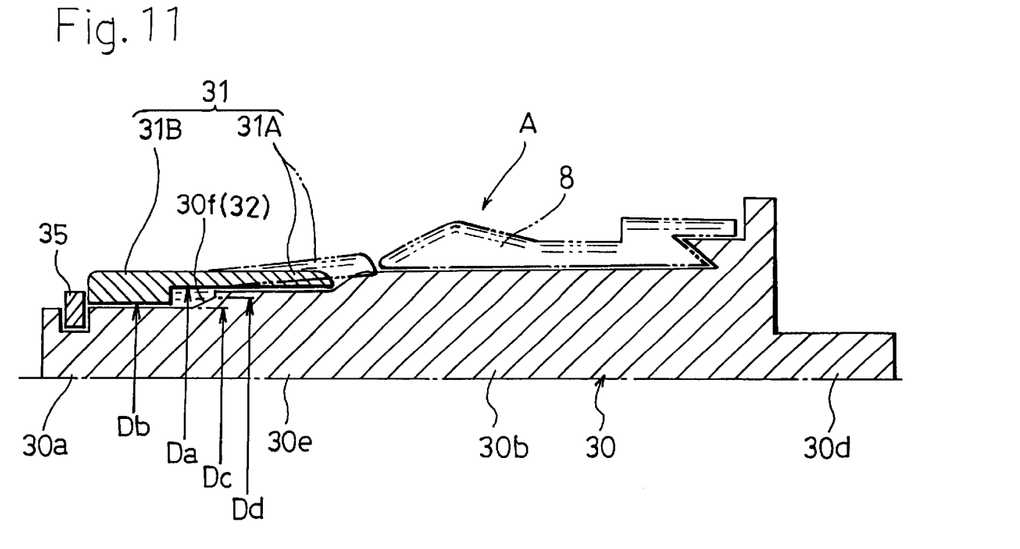
FIG. 11 is a longitudinal half section side view showing a third embodiment of the inner ring press-insertion jig for a pipe joint made of resin according to the invention.
Figure 12:
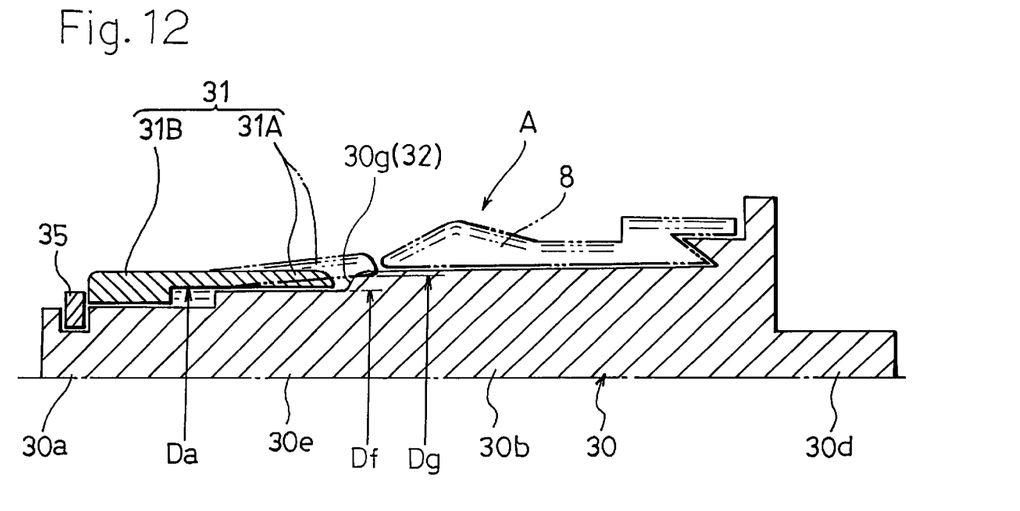
FIG. 12 is a longitudinal half section side view showing a fourth embodiment of the inner ring press-insertion jig for a pipe joint made of resin according to the invention.

FIGS. 11 and 12 are longitudinal half section side views respectively showing third and fourth embodiments of the inner ring press-insertion jig in which a fixing structure different from that of the first embodiment is employed as the fixing structure 32 for positionally fixing the diameter-increasing ring member 31 to the holder 30 when the outer diameter of the diameter-increasing ring member 31 is changed to the maximum outer diameter (Dmax.).

In the third and fourth embodiments, the diameter-increasing ring member 31 of the inner ring press-insertion jig A is formed by: a front diameter-variable portion 31A in which plural notched portions 31a are arranged in the circumferential direction, and which is changeable to the maximum outer diameter (Dmax.) and to the minimum outer diameter (Dmin.); and a base fixed cylindrical portion 31B having an inner diameter Db which is smaller than the inner diameter Da of the front diameter-variable portion 31A, and which is to be fitted into the front small-diameter portion 30a of the holder 30. On the other hand, the holder 30 has: the front small-diameter portion 30a which fittingly holds the base fixed cylindrical portion 31B of the diameter-increasing ring member 31; a large-diameter portion 30b which insertingly holds the inner ring 8, and which is straight; an intermediate-diameter portion 30e which is located between the portions 30a and 30b, and which fittingly holds the front diameter-variable portion 31A of the diameter-increasing ring member 31; and a mounting shaft portion 30d. The whole of the holder is integrally formed by a resin material.

In the third embodiment shown in FIG. 11, a conical tapered face 30f in which the outer diameter is changed from Dc (<Db) to Dd (>Db) is formed in a step connecting place between the front small-diameter portion 30a and the intermediate-diameter portion 30e of the holder 30. A fixing structure 32 is configured so that, when the diameter-increasing ring member 31 is moved in one of the axial directions so as to change the outer diameter of the front diameter-variable portion 31A to the maximum outer diameter (Dmax.) as indicated by the phantom lines, the end portion of the inner peripheral face of the base fixed cylindrical portion 31B of the diameter-increasing ring member 31 is fitted onto the conical tapered face 30f in a shrink fitting state, whereby the diameter-increasing ring member 31 is positionally fixed to the holder 30.

In the fourth embodiment shown in FIG. 12, a conical tapered face 30g in which the outer diameter is changed from Df (<Da) to Dg (>Da) is formed in a connecting place between the intermediate-diameter portion 30e and the large-diameter portion 30b of the holder 30. A fixing structure 32 is configured so that, when the diameter-increasing ring member 31 is moved in one of the axial directions so as to change the outer diameter of the front diameter-variable portion 31A to the maximum outer diameter (Dmax.) as indicated by the phantom lines, the inner peripheral face of the front diameter-variable portion 31A of the diameter-increasing ring member 31 is fitted onto the conical tapered face 30g in a shrink fitting state, whereby the diameter-increasing ring member 31 is positionally fixed to the holder 30.

Figure 13:
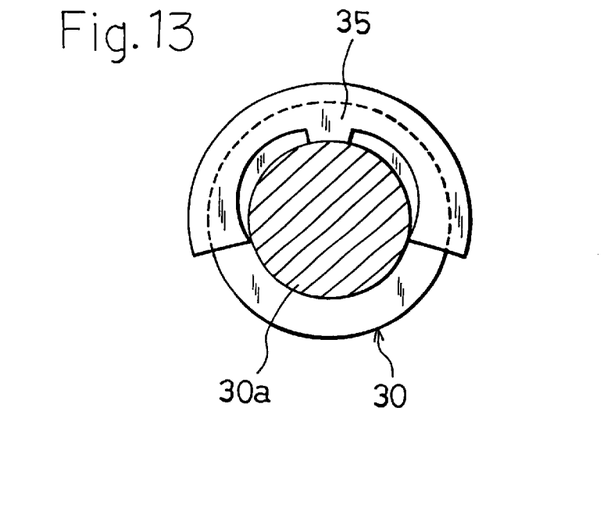
FIG. 13 is an enlarged longitudinal section front view of main portions of the inner ring press-insertion jig for a pipe joint made of resin shown in FIGS. 11 and 12.

In the inner ring press-insertion jig A of the third and fourth embodiments, as a stopper which limits the position of the diameter-increasing ring member 31 in the axial directions when the diameter-increasing ring member 31 is moved in the other one of the axial directions so that the outer diameter of the front diameter-variable portion 31A is changed to the minimum outer diameter (Dmin.), a structure is employed in which, as shown in FIG. 13, a groove 30*h* is formed in the small-diameter portion 30*a* of the holder 30 and a snap ring 35 having a substantially E-like shape is fitted into the groove 30*h*.

The entire disclosure of Japanese Patent Application No. 11-109431 filed on Apr. 16, 1999 including specification, claims, drawings and summary are incorporated herein by reference in its entirety.

What is claimed is:

1. An inner ring press-insertion jig for a pipe joint made of resin which is pressingly inserted and fixed in one end portion of a pipe member made of resin by relative movement in an axial direction with respect to the pipe member, comprising:

a sleeve-like inner ring;

a diameter-increasing ring member having a variable outer diameter is fitted onto a front small-diameter portion of a holder to be movable in the axial direction, said sleeve-like inner ring being inserted into and held by said holder;

said diameter-increasing ring member is configured so that an outer diameter is changed to a maximum outer diameter by movement in the axial direction with respect to said holder, the maximum diameter being equal to or larger than an outer diameter of a tip end portion of said inner ring, and to a minimum outer diameter by movement in another one of the axial directions with respect to said holder, the axial diameter being smaller than an inner diameter of said inner ring; and a fixing structure which, when the diameter of said diameter-increasing ring member is changed to the maximum outer diameter, positionally fixes said diameter-increasing ring member to said holder is formed between said diameter-increasing ring member and said holder in a manner that the fixation can be canceled.

2. An inner ring press-insertion jig for a pipe joint made of resin according to claim 1, wherein said fixing structure includes: a projected portion which projects radially from an inner peripheral face of said diameter-increasing ring member or an outer peripheral face of said holder; an axial sliding guiding groove which is formed in an outer peripheral face of said holder or an inner peripheral face of said diameter-increasing ring member so as to be fitted with said projected portion to slidingly guide axial movement of said diameter-increasing ring member; a projected piece which is projectingly formed on the outer peripheral face of said holder or the inner peripheral face of said diameter-increasing ring member to be continuous with an end portion of said sliding guiding groove, and which can be moved to over-ride said projected portion immediately before the outer diameter of said diameter-incraeasing ring member is changed to the maximum outer diameter; and an engaging groove which is formed in the outer peripheral face of said holder or the inner peripheral face of said diameter-increasing ring member, and with which said projected portion that is moved to over-ride said projected piece under a state where the outer diameter of said diameter-increasing ring member is changed to the maximum outer diameter is to be engaged.

3. An inner ring press-insertion jig for a pipe joint made of resin according to claim 1, wherein said diameter-increasing ring member includes: a front diameter-variable portion which is changeable to the maximum outer diameter and to the minimum outer diameter; and a base fixed cylindrical portion having an inner diameter which is smaller than an inner diameter of said front diameter-variable portion, and which is fitted into said front small-diameter portion of said holder, said holder includes: said front small-diameter portion which fittingly holds said base fixed cylindrical portion of said diameter-increasing ring member; a large-diameter portion which insertingly holds said inner ring; and an intermediate-diameter portion which is located between said front small-diameter portion and said large-diameter portion, and which fittingly holds said front diameter-variable portion of said diameter-increasing ring member, and a fixing structure configured in which a conical tapered face is formed in a connecting place between said front small-diameter portion and said intermediate-diameter portion of said holder, and, when said diameter-increasing ring member is moved in one of the axial directions so that an outer diameter of said front diameter-variable portion is changed to the maximum outer diameter, the tip end inner peripheral face of said base fixed cylindrical portion of said diameter-increasing ring member is fitted onto said conical tapered face of said holder in a shrink fitting state, thereby positionally fixing said diameter-increasing ring member to said holder.

4. An inner ring press-insertion jig for a pipe joint made of resin according to claim 3, wherein a snap ring having a substantially E-like shape is fitted to said front small-diameter portion of said holder, as a stopper which abuts against an end face of said base fixed cylindrical portion of said diameter-increasing ring member to limit a position of said diameter-increasing ring member in the axial direction when said diameter-increasing ring member is moved in another one of the axial direction with respect to said holder to change the outer diameter of said diameter-increasing ring member to the minimum outer diameter.

5. An inner ring press-insertion jig for a pipe joint made of resin according to claim 1, wherein said diameter-increasing ring member includes: a front diameter-variable portion which is changeable to the maximum outer diameter and to the minimum outer diameter; and a base fixed cylindrical portion having an inner diameter which is smaller than an inner diameter of said front diameter-variable portion, and which is fitted into said front small-diameter portion of said holder, said holder is formed by: said front small-diameter portion which fittingly holds said base fixed cylindrical portion of said diameter-increasing ring member; a large-diameter portion which insertingly holds said inner ring; and an intermediate-diameter portion which is located between said front small-diameter portion and said large-diameter portion, and which fittingly holds said front diameter-variable portion of said diameter-increasing ring member, and a fixing structure is configured in which a conical tapered face is formed in a connecting place between said intermediate-diameter portion and said large-diameter portion of said holder, and, when said diameter-increasing ring member is moved in one of the axial directions so that an outer diameter of said front diameter-variable portion is changed to the maximum outer diameter, the inner peripheral face of said front diameter-variable portion of said diameter-increasing ring member is fitted onto said conical tapered face of said holder in a shrink fitting state, thereby positionally fixing said diameter-increasing ring member to said holder.

6. An inner ring press-insertion jig for a pipe joint made of resin according to claim 5, wherein a snap ring having a substantially E-like shape is fitted to said front small-diameter portion of said holder, as a stopper which abuts against an end face of said base fixed cylindrical portion of said diameter-increasing ring member to limit a position of said diameter-increasing ring member in the axial direction when said diameter-increasing ring member is moved in another one of the axial direction with respect to said bolder to change the outer diameter of said diameter-increasing ring member to the minimum outer diameter.

7. An inner ring press-insertion jig for a pipe joint made of resin according to claim 6, wherein, among said holder and said diameter-increasing ring member, said diameter-increasing ring member is configured from fluororesin.

8. An inner ring press-insertion jig for a pipe joint made of resin according to claim 1, wherein said holder, and said diameter-increasing ring member are configured from resin material.

9. An inner ring press-insertion jig for a pipe joint made of resin according to claim 1, wherein said holder is configured from metal material.

10. An inner ring press-insertion jig for a pipe joint made of resin according to claim 9, wherein said holder is configured from metal material, and a resin coating layer is applied to the outer peripheral face of said holder made of a metal material.

11. An inner ring press-insertion jig for a pipe joint made of resin according to claim 10, wherein said resin coating layer is a coating of fluororesin.

* * * * *